United States Patent [19]
Nozawa et al.

[11] Patent Number: 4,585,377
[45] Date of Patent: Apr. 29, 1986

[54] NUMERICAL-CONTROLLED MACHINE TOOL

[75] Inventors: Ryoichiro Nozawa, Shibuya; Hideaki Kawamura, Hachioji; Shuji Matsuura, Hino, all of Japan

[73] Assignee: Fanuc Ltd, Minamitsuru, Japan

[21] Appl. No.: 463,870

[22] PCT Filed: May 26, 1982

[86] PCT No.: PCT/JP82/00197
§ 371 Date: Jan. 27, 1983
§ 102(e) Date: Jan. 27, 1983

[87] PCT Pub. No.: WO82/04210
PCT Pub. Date: Dec. 9, 1982

[30] Foreign Application Priority Data
May 29, 1981 [JP] Japan .................................. 56-82381

[51] Int. Cl.[4] .......................... B23F 5/22; B23F 15/02
[52] U.S. Cl. ..................................... 409/2; 51/2 AA; 51/95 GH; 364/474; 409/15
[58] Field of Search ........................ 409/2, 15, 17, 11; 51/2 AA, 95 GH, 287; 364/474

[56] References Cited
U.S. PATENT DOCUMENTS
3,204,532  9/1965  Budnick ............................ 409/15 X
3,267,344  8/1966  McDaniel .......................... 409/2 X
4,178,537 12/1979  Angst ................................. 409/15

FOREIGN PATENT DOCUMENTS
56-15919  2/1981  Japan .

Primary Examiner—Z. R. Bilinsky
Attorney, Agent, or Firm—Staas & Halsey

[57] ABSTRACT

The present invention has for its object to make it possible to stop the relative movement of a cutter and a gear blank or change its speed during cutting in a numerical-controlled machine tool for cutting a gear, such as a gear hobbing machine, a gear grinding machine or the like. To perform this, two kinds of pulse distributors, i.e. a synchronization control pulse distributor (152) and a tooth profile forming pulse distributor (153) are provided; the synchronization between the rotation of a cutter (110) and the rotation of a gear blank is provided by the synchronization control pulse distributor (152); and an additional rotation of the rotary shaft of the gear blank necessary for forming the tooth profile of a gear is effected by the tooth profile forming pulse distributor (153).

5 Claims, 2 Drawing Figures

NUMERICAL-CONTROLLED MACHINE TOOL

BACKGROUND OF THE INVENTION

The present invention relates to a numerical-controlled machine tool for cutting a gear, such as a gear hobbing machine, a gear grinding machine or the like.

Generally, in this kind of machine tool, the synchronous relationships of the rotation of a cutter, such as a hob or the like, the rotation of a table carrying a workpiece and the vertical movement of the cutter are determined in accordance with the number of teeth and the tooth profile of the gear to be cut. In consequence, also in conventional numerical-controlled machine tools, command pulses are naturally distributed to respective drive shafts so that the synchronous relationships may be satisfied. In the prior art, however, the distribution pulses are produced by mounting a pulse generator on the shaft of the cutter and performing an operation of obtaining a unit amount of movement of each shaft which satisfies the above synchronous relationships, for each pulse generated by the rotation of the cutter; it is difficult to stop the vertical movement of a hob or change its speed, for example, during hobbing a helical gear. Accordingly, the prior art has the defect of severe limitations imposed on cutting conditions.

SUMMARY OF THE INVENTION

An object of the present invention is to make it possible to stop the relative movement of a cutter and a gear blank or change its speed during cutting in a numerical-controlled machine tool for cutting a gear, such as a gear hobbing machine, a gear grinding machine or the like.

The numerical-controlled machine tool of the present invention is provided with a synchronization control pulse distributor for controlling the synchronous relationship between the rotation of a cutter and the rotation of a gear blank, which is determined in accordance with the number of teeth of a gear to be obtained, a tooth profile forming pulse distributor for controlling a vertically-moving shaft of at least the cutter or the gear blank and a rotary shaft of the gear blank, and an adder for adding together distribution pulses of the tooth profile forming pulse distributor and the synchronization control pulse distributor to produce command pulses to be supplied to the rotary shaft of the gear blank. The synchronization between the rotation of the cutter and the rotation of the gear blank is provided by the synchronization control pulse distributor and an additional rotation of the gear blank necessary for forming the tooth profile of the gear is performed by the tooth profile forming pulse distributor, so that even if the vertical movement of the cutter, such as a hob, is stopped or its feed rate is changed during cutting, no troubles will be caused since the rotary shaft of the gear blank (a shaft C) and the rotary shaft of the cutter cutter (a shaft T), such as hob, are synchronized with each other. Accordingly, cutting conditions can be changed freely.

DESCRIPTION OF THE PREFERRED EMBODIMENTS

Figure 1:
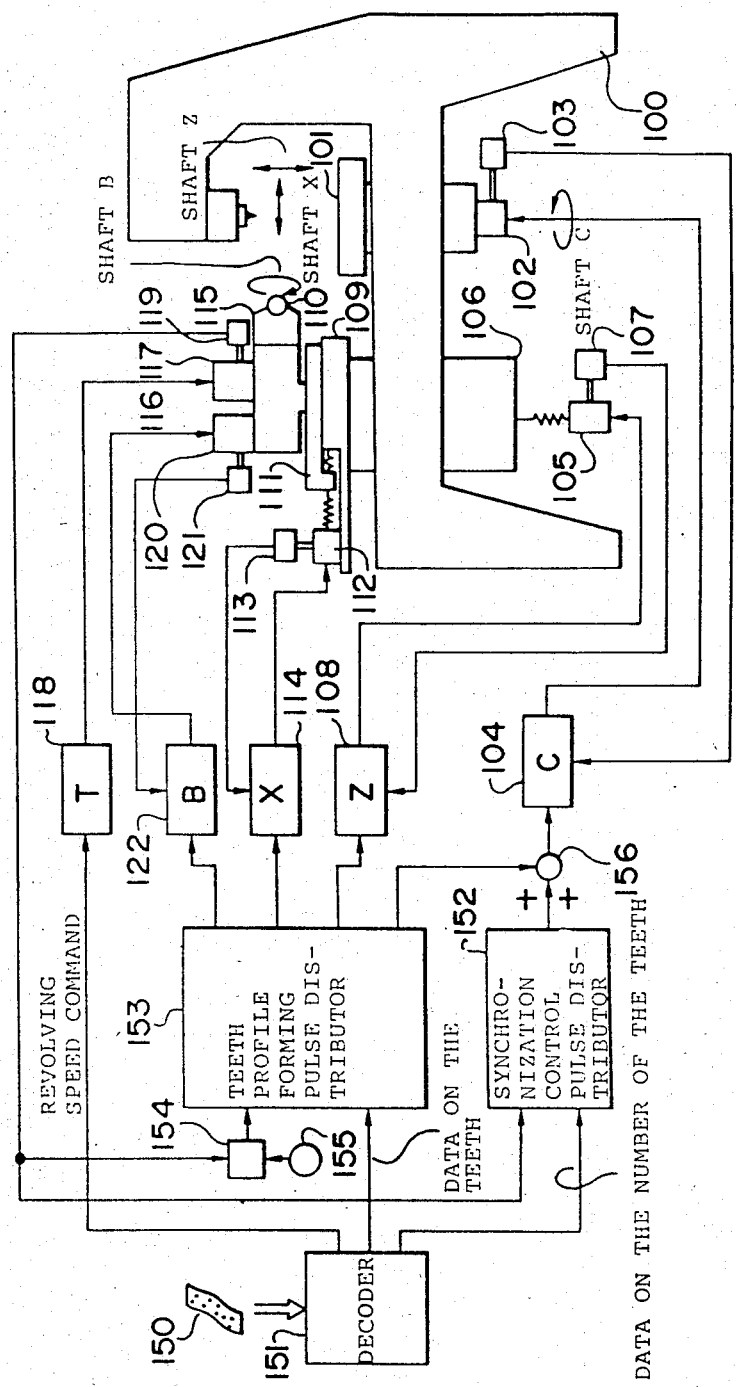
FIG. 1 is a diagram showing the arrangement of the principal part of an embodiment of the present invention.

FIG. 1 illustrates the arrangement of the principal part of an embodiment of the present invention as being applied to a numerical-control gear hobbing machine.

In FIG. 1, reference numeral 100 indicates a bed of the gear hobbing machine and 101 a table pivotally mounted on the bed 100, on the top surface of which a gear blank can be mounted. The table 101 is driven by a motor 102 (the drive shaft of which will hereinafter be referred to as the shaft C) and its rotational position is detected by a position detector 103 and fed back to a C-shaft servo unit 104, by which the table is controlled in position. On the bed 100 is mounted a ram 106 which is driven by a motor 105 (the drive shaft of which will hereinafter be referred to as the shaft Z) to be movable up and down and its vertical position is detected by a position detector 107 and fed back to a Z-shaft servo unit 108, by which the ram is controlled in position. The relative vertical movement of a hob 110 and a gear blank is performed by vertical movement of the ram 106 in this embodiment but it may also be effected by vertical movement of the table 101.

On the top of the ram 106 is provided a fixed table 109, on which placed a horizontal slide rest 111 for cross feeding the hob 110. The horizontal slide rest 111 is movable back and forth by a motor 112 (the drive shaft of which will hereinafter be referred to as the shaft X) and its position is detected by a position detector 113 and fed back to an X-shaft servo unit 114, by which the slide rest is controlled in position. On the horizontal slide rest 111 is provided a hob mount 115, and the hob 110 installed thereon is driven by a spindle motor 117 the drive shaft will hereinafter be referred to as the shaft T) mounted on an upper fixed table 116. The spindle motor 117 is speed controlled by a servo unit 118. A pulse coder 119 is mounted on the shaft T and a pulse signal synchronized with the rotation of the hob 118 is supplied to each part. Furthermore, the hob mount 115 is adapted so that it can turn in a vertical plane parallel to the hob shaft, and this turn is performed by a motor 120 (the drive shaft of which will hereinafter be referred to as the shaft B) and its angle of turn is detected by a position detector 121 and fed back to a B-shaft servo unit 122.

On the side of the numerical controller, the content of command data 150 or a gear command is decoded by a decoder 151; a revolving speed command for the spindle motor 17 is provided to the T-shaft servo unit 118; data on the number of teeth for a gear to be obtained or a tooth number command is provided to a synchronization control pulse distributor 152; and data on the teeth profile or a tooth profile command is provided to a teeth profile forming pulse distributor 153.

Letting the number of output pulse of the pulse coder 119 for each rotation of the hob be represented by $P_{360}$, the number of distribution pulses necessary for each rotation of the gear blank to be cut (the table 101) be represented by $C_{360}$, the sum total of distribution pulses to the shaft C after the start of cutting be represented by $C_n$ and the number of pulses from the pulse coder 119 after the start of cutting be represented by $p_n$, the synchronization control pulse distributor 152 performs such a pulse distribution that the number of the distribution pulses to the shaft C is given by the following expression:

$$C_n = \frac{C_{360}}{N \times P_{360}} \times P_n \qquad (1)$$

On the other hand, the tooth profile forming pulse distributor 153 performs the following pulse distribution in accordance with the shape of the gear to be obtained:

(1) Straight gear (Spur gear)

In this case, the pulse distribution is performed so that the shaft Z may reach a specified feed rate. Incidentally, either one of the pulse coder 119 and a pulse generator 155 is selected by changing over a gate 154 depending on whether the feed rate of the shaft Z is selected to be a feed rate proportional to the revolution of the cutter, mm(deg)/rev, or a feed rate per minute, mm(deg)/min. This applies to the cutting of the following gears of other kinds.

(2) Helical gear

In this case, letting the module of the gear be represented by m and the helix angle of the tooth trace be represented by B, pulses are distributed between the shafts Z and C in a manner to satisfy the relation given by the following expression:

$$\frac{C}{Z} = \frac{\sin \beta}{\pi \cdot N \cdot m} \qquad (2)$$

(3) Straight taper gear

In this case, a linear interpolation is performed by the shafts X and Z in accordance with such an angle of taper $\alpha$ as given by the following expression:

$$X/Z = \tan \alpha \qquad (3)$$

(4) Straight crowning gear

In this case, a circular interpolation of a radius corresponding to the amount of crowning is performed by the shafts X and Z.

(5) Helical taper gear

In this case, a simultaneous three-axis linear interpolation is performed by the shafts C, Z and X so that the relationship between the shafts Z and C may satisfy expression (2) and that the relationship between the shafts X and Z may satisfy expression (3).

(6) Helical crowning gear

Figure 2:
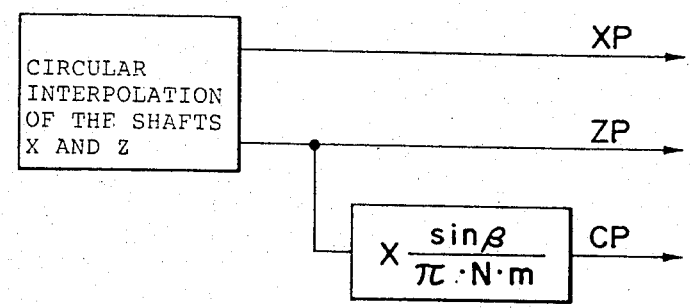
FIG. 2 is a diagram explanatory of the operation of a tooth profile forming pulse distributor in the cutting of a helical crowing gear.

In this case, for instance, as shown in a functional block diagram of FIG. 2, a circular interpolation of a radius corresponding to the amount of crowning is performed by the shafts X and Z first and then the amount of movement of the shaft C, CP, which satisfies the relationship of expression (2) is computed from the resulting amount of movement of the shaft Z, ZP, thereby obtaining distribution pulses to the shafts X, Z and C.

On the distribution pulses to the respective shafts thus produced by the two pulse distributions 152 and 153, the distribution pulses to the shaft C are added together by an adder 156 to obtain a command pulse, which is applied to the C-shaft servo unit 104. That is, the synchronization control pulse distributor 152 produces distribution pulses necessary for cutting a spur gear of the same number of teeth as the gear to be cut, and the tooth profile forming pulse distributor 153 produces distribution pulses for the additional revolution of the shaft C which is required according to the tooth profile and other distribution pulses. Accordingly, when the operation of the tooth profile forming pulse distributor 153 alone is stopped in the course of hobbing, the C-shaft motor is revolved driven by the output pulses of the synchronization control pulse distributor 152, and since this revolution is synchronized with the hob shaft (the shaft T), no trouble will arise even if the feed of the shaft Z is stopped. In other words, stoppage of the vertical movement of the hob 110 or a change of its feed rate can easily by achieved during cutting. It is also possible, of course, to change the feed rates of the shafts B and X other than the shaft Z.

While the foregoing embodiment has been described in connection with the case where the pulse coder 119 is mounted on the shaft T and the shaft T is driven by the spindle motor, it is also possible to employ such an arrangement in which a simultaneous two-axis linear interpolation for the shafts C and T is performed by the synchronization control pulse distributor 152 and the shaft T is driven by a position control servo motor controlled by the numerical controller as is the case with the shaft C. With such an arrangement, more complex control can be achieved easily.

We claim:

1. A numerical-controlled machine tool control system for cutting a gear, using a gear hobbing machine, gear grinding machine or the like based on a received gear command including a number of teeth to be cut and a tooth profile, said tool comprising:

a synchronization control pulse distributor for controlling a synchronous relationship between rotation of a cutter and rotation of a gear blank which is determined by the cutter and rotation of a gear blank which is determined by the number of teeth of a gear to be cut based on the gear command;

a tooth profile forming pulse distributor for controlling at least a vertically-moving shaft of the cutter or the gear blank and a rotary shaft of the gear blank for forming the tooth profile of the gear to be cut which is determined by the tooth profile from the gear command; and an adder for adding together distribution pulses from said tooth profile forming pulse distributor and said synchronization control pulse distributor to produce command pulses for application to the rotary shaft of the gear blank.

2. A control system for a numerical controlled machine tool motor which controls a distance between a hob and a gear blank to machine a specified gear using a gear command including a tooth profile command specifying a profile of a gear and a tooth number command specifying a number of teeth, and a rotation pulse signal, said system comprising:

first means for producing motor control pulses for machining the gear in dependence upon the tooth number command and the rotation pulse signal;

second means for producing additional motor control pulses necessary to machine the profile of the gear specified by the tooth profile command in dependence upon the tooth profile command and the rotation pulse signal; and an adder, operatively connected to said first and second means and the motor, for adding the motor control pulses and the additional motor control pulses to control the motor to produce a profiled gear.

3. A control system as recited in claim 2, further comprising a hob rotation pulse coder for producing the rotation pulse signal.

4. A control system as recited in claim 2, further comprising a pulse generator for producing the rotation pulse signal.

5. A control system as recited in claim 2, wherein said control system is connected to X and Z axis motors and a hob spindle motor, and said second means produces motor control pulses for controlling X and Z axis motors and a hob spindle motor in dependence upon the tooth profile command.

* * * * *

UNITED STATES PATENT AND TRADEMARK OFFICE
CERTIFICATE OF CORRECTION

PATENT NO. : 4,585,377
DATED : April 29, 1986
INVENTOR(S) : RYOICHIRO NOZAWA ET AL.

It is certified that error appears in the above-identified patent and that said Letters Patent is hereby corrected as shown below:

Col. 1, line 60, delete "cutter" (second occurrence).

Col. 2, line 29, after "which" insert --is--;

line 59, "pulse" (first occurrence) should be --pulses--;

line 66, "$p_n$," should be --$P_n$,--.

Col. 3, line 24, "B," should be --$\beta$,--.

Signed and Sealed this

Fifth Day of August 1986

[SEAL]

Attest:

DONALD J. QUIGG

Attesting Officer

Commissioner of Patents and Trademarks